United States Patent [19]
Larsen et al.

[11] Patent Number: 5,775,258
[45] Date of Patent: Jul. 7, 1998

[54] SANITIZATION SYSTEM FOR CAT LITTER BOXES

[76] Inventors: Knut H. Larsen; Ashley L. Larsen, both of 6206 Opal St., Alta Loma, Calif. 91701; Deborah L. Demelo, 817 S. Magnolia St.#E, Ontario, Calif. 91762

[21] Appl. No.: 678,993

[22] Filed: Jul. 12, 1996

[51] Int. Cl.$^6$ .................................................. A01K 1/035
[52] U.S. Cl. ........................ 119/161; 119/170; 119/165; 294/1.3; 248/100
[58] Field of Search ........................ 119/161, 165, 119/166, 170; 294/1.3, 55, 1.4, 1.5; 209/614, 418, 419, 374; 248/95, 99, 100, 101; 206/229, 230, 804; 220/574.1, 735; 15/257.1; 401/128, 130; 215/228, DIG. 5

[56] References Cited

U.S. PATENT DOCUMENTS

| | | | |
|---|---|---|---|
| 895,759 | 8/1908 | Hulbert | 248/100 |
| 2,231,197 | 2/1941 | Scioscia | 401/128 |
| 2,257,058 | 9/1941 | Johnson et al. | 248/100 |
| 3,735,735 | 5/1973 | Noroian | 119/165 |
| 3,796,453 | 3/1974 | Grimes | 294/1.3 |
| 3,965,863 | 6/1976 | Scott | 119/166 |
| 4,226,456 | 10/1980 | Barnett | 294/1.3 |
| 4,517,920 | 5/1985 | Yamamoto | 119/166 |
| 4,926,794 | 5/1990 | Yamamoto | 119/165 |
| 5,076,627 | 12/1991 | Simon | 209/417 |
| 5,186,506 | 2/1993 | Gale | 294/1.3 |
| 5,190,326 | 3/1993 | Nunn | 294/55 |
| 5,226,388 | 7/1993 | McDaniel | 119/166 |
| 5,259,340 | 11/1993 | Arbogast | 119/165 |

FOREIGN PATENT DOCUMENTS

| | | | |
|---|---|---|---|
| 259293 | 3/1988 | European Pat. Off. | 119/166 |
| 1336746 | 7/1963 | France | 220/735 |
| 672873 | 1/1990 | Switzerland | 294/1.3 |

*Primary Examiner*—Todd E. Manahan
*Attorney, Agent, or Firm*—Frederick Gotha

[57] ABSTRACT

A sanitization system for cat litter boxes is presented which is composed of a scoop device for straining cat litter where the scoop device has a handle member from which a scoop region extends axially. At a predetermined distance axially from the scoop region, a containment member extends laterally of the handle where the containment member has a multiplicity of venting orifices extending therethrough. A fluid reservoir is removably attachable to the cat litter box. The fluid reservoir is defined by a housing having an open end and a cavity chamber where the cavity chamber is so dimensioned and constructed to be in fluid communication with the open to permit the passage of fluid through the open end. A deodorizing and disinfectant fluid is carried in the reservoir. To seal the reservoir, the dimensions of the open end of the reservoir and of the containment member are substantially identical such that when the scoop is stored in the reservoir the containment member will seal it and permit deodorizing vapors to escape through the orifices. The system also includes a plastic bag holder which is defined by a frame having a multiplicity of suspension members from which the plastic bag may be suspended. The plastic bag holder is removably mounted to the cat litter box and thus provides a ready means for disposal of the cat fecal matter.

14 Claims, 3 Drawing Sheets

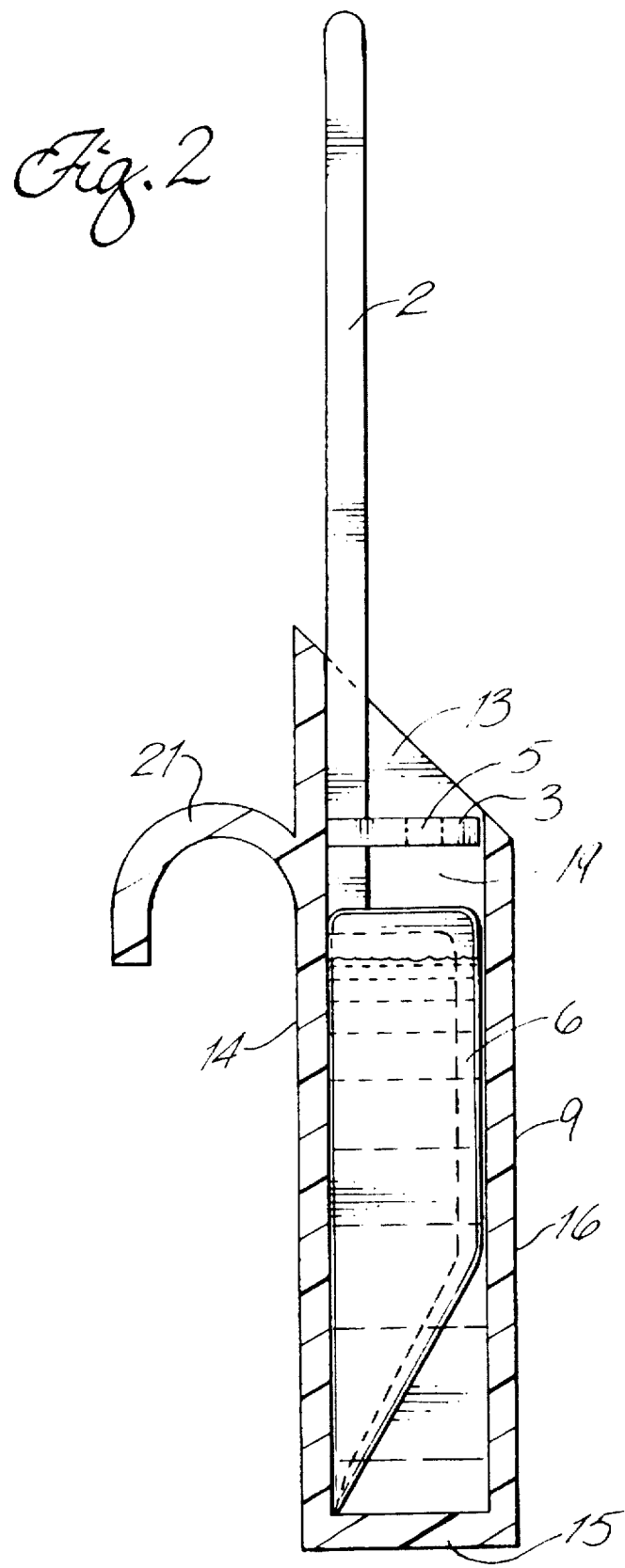

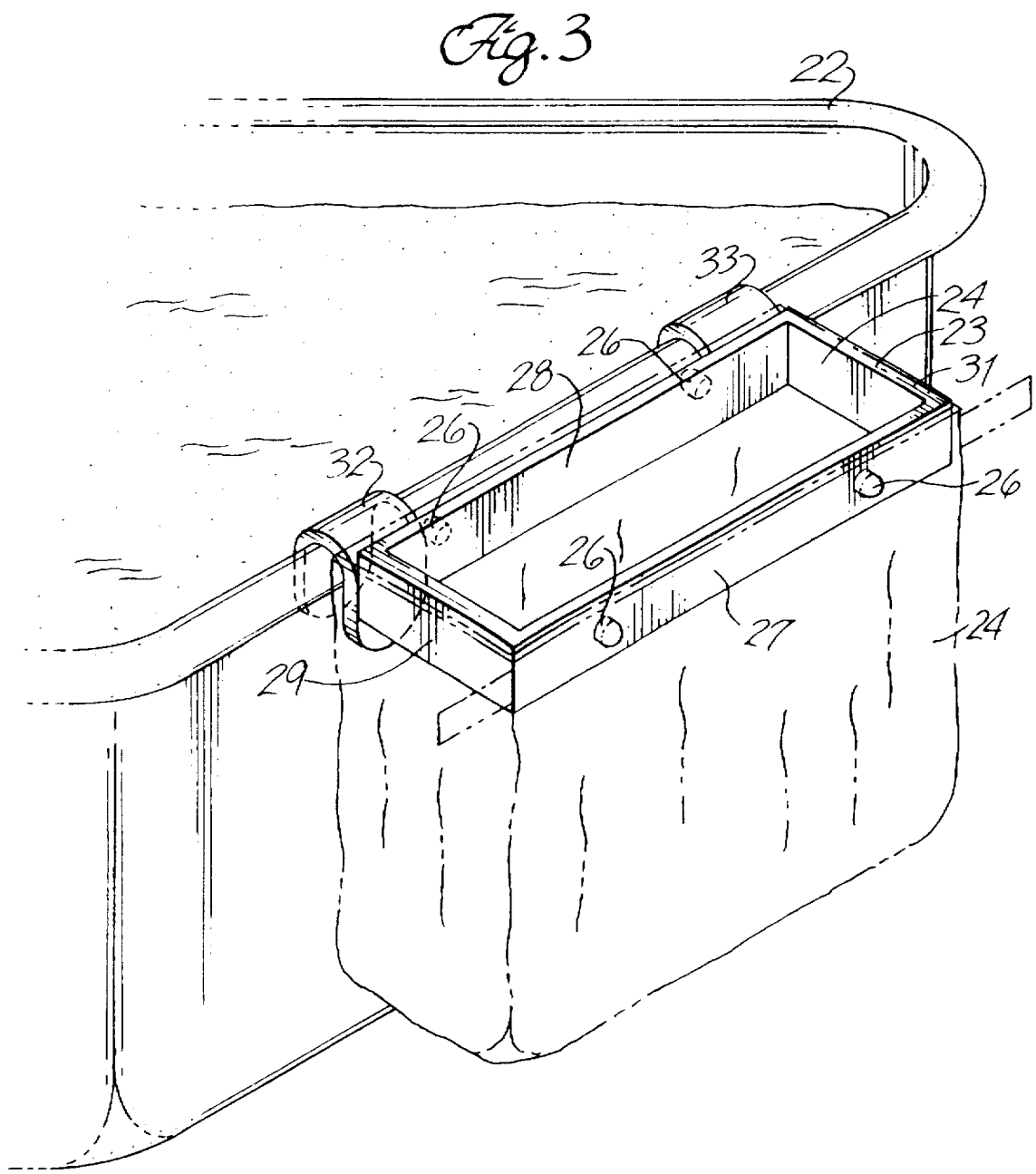

SANITIZATION SYSTEM FOR CAT LITTER BOXES

FIELD OF THE INVENTION

This invention relates to a sanitization system for cat litter boxes which provides for the removal of cat fecal matter, continuous deodorization, and ready-waste disposal.

BACKGROUND OF THE INVENTION

Cat fecal matter has been traditionally removed from litter boxes by the use of a scoop through which the matter is strained. To remove the fecal matter, the straining end of the scoop is inserted into the litter beneath the fecal matter and then lifted to permit the litter to strain through. The fecal matter is thereafter disposed of by direct deposit into the household waste removal system or by depositing the matter into a container for ultimate placement with garbage disposal. Although there are many types of cat litter which act to deodorize the odor associated with litter box usage and sanitize the environment, the litter scoop in the removal of the fecal matter may become contaminated with causative agents of virucital activity. Such usage enhances the probability of the spread of infection.

It is therefore desirable to provide a system which not only disinfects the litter scoop but also deodorizes the environment of a litter box. The system may also provide a ready means to dispose of the cat fecal matter, particularly in those communities where direct deposit of the matter into the household waste system is prohibited by law.

SUMMARY OF THE INVENTION

The present invention is directed to a sanitation system for cat litter boxes where the system disinfects the litter scoop, provides deodorization of the litter box environment and supplies disposal bags for ready containment of the cat fecal matter which is thereafter deposited in the waste removal or garbage removal system of the household.

The sanitization system for cat litter boxes of this invention has a litter box scoop, a removably mounted litter box disinfectant and deodorizing fluid reservoir containing a disinfectant deodorization fluid, and a frame member which may be removably mounted to the cat litter box for holding plastic bags into which the cat fecal matter may be deposited. The litter box scoop has a handle member which has an axis of elongation and a scoop region extending axially from the end of the handle. The scoop region has an opening which is so dimensioned and proportioned to permit the litter to be strained therethrough. A containment member extends symmetrically and laterally of the handle member and is located a predetermined distance axially from the scoop region. A multiplicity of axially extending orifices extend through the containment member to act as vents such that fluid or vapor may pass through the containment member. To provide for sanitization of the litter box scoop, a removably mounted litter box disinfectant fluid reservoir is utilized. The disinfectant fluid reservoir has a housing which has an open end and a cavity chamber contained within the housing where the open end communicates with the cavity. The cavity is sealingly bounded by the housing such that disinfectant fluid contained within the reservoir will be sealingly retained within the housing and so dimensioned and constructed to permit the passage of fluid through the open end.

One embodiment of the disinfectant fluid reservoir is a rectangular box-like structure having thin sidewalls bounding the reservoir chamber. The reservoir chamber is so dimensioned and proportioned to receive the scoop region of the litter box scoop device for removable captive containment within the reservoir. An attachment member extends from the housing to permit removable mounting of the fluid reservoir to the cat litter box. After attachment, the reservoir is positioned to retain the disinfectant and deodorizing fluid and to captively accept the scoop region of the litter box scoop device. The containment member of the scoop device and the open end of the housing have like dimensions which permits the containment member to act as a seal of the reservoir chamber. Upon vaporization, the disinfectant and deodorization fluid is permitted to pass through the orifices in the containment member and thus promote deodorization of the litter box environment. The system further includes a bag holder which has a frame and a multiplicity of suspension members carried by the frame. The suspension members extend therefrom from which a bag may be suspended. An attachment member extends from the frame for removably mounting the frame to the litter box.

Another embodiment of the fluid reservoir has a multiplicity of suspension members for suspending the plastic bags extending from the front wall of the fluid reservoir and a first storage region carried by a sidewall of the fluid reservoir and a second storage region carried by a sidewall of the fluid reservoir. The first storage region is so dimensioned and proportioned to permit the storage of plastic bags and the second storage region is so dimensioned and proportioned to permit the storage of ties for the plastic bags.

An object of the present invention, therefore, is to provide a litter box scoop device which may be sanitized by insertion into a disinfectant and deodorizing fluid contained within a litter box disinfectant fluid reservoir.

Another object of the present invention is to provide a litter box disinfectant fluid reservoir for containing a disinfectant and deodorizing fluid where the reservoir is removably mountable to a cat litter box.

Still another object of the present invention is to provide a plastic bag holder which is removably mountable to a cat litter box for supporting plastic bags into which cat fecal matter may be deposited and the bag thereafter removed for disposal.

A further object of this invention is to provide a system which is comprised a litter box scoop device, a litter box disinfectant fluid reservoir, and a litter box plastic bag holder to permit for the disinfecting of the litter box scoop device after use, deodorizing the litter box environment, and allowing for ready removal of the cat fecal matter into plastic bags.

BRIEF DESCRIPTION OF THE DRAWINGS

These and other features and advantages will become appreciated as the same become better understood with reference to the following specification, claims and drawings wherein:

FIG. 2 is a cross-sectional view of the disinfectant fluid reservoir with the litter box scoop device inserted and held therein.

FIG. 3 is a perspective view of the bag holder portion of the system of this invention removably attached to a cat litter box.

DETAILED DESCRIPTION

Figure 1:
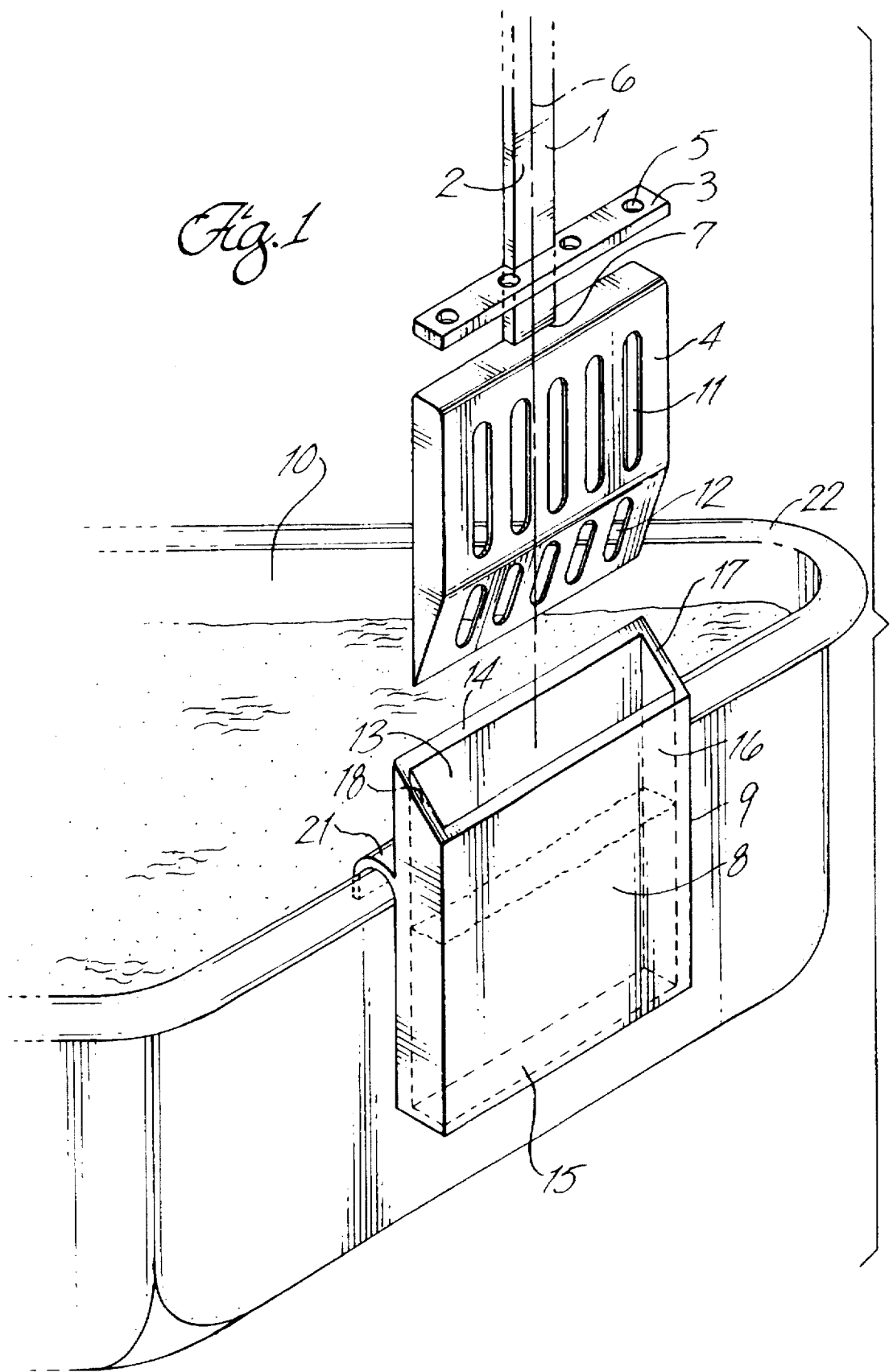
FIG. 1 is a perspective view of the litter scoop device and disinfectant fluid reservoir of this invention.

The sanitation system for a cat litter box of this invention is shown in perspective in FIG. 1 and has a scoop device 1 which is composed of a handle member 2, a containment member 3 and a scoop region 4. Handle member 1 has an axis of elongation 6 and a first end 7 where the scoop region 4 extends axially from first end 7. As can be seen in FIG. 1, containment member 3 is a thin flat plate which extends laterally of the handle 1. The purpose of containment member 3 is to form a seal over the disinfectant and deodorizing fluid 8 retained by the disinfectant fluid reservoir 9. In order to permit deodorizing vapors to escape from reservoir 9, containment member 3 has a multiplicity of axially extending orifices 5 that extend through the containment member. These orifices allow evaporated deodorizing fluid to pass into the litter box cavity 10 environment.

The scoop region 4 of the scoop device has a plurality of axially extending openings 11 which are substantially parallel to each other and a second multiplicity of openings 12 which are also substantially parallel to each other for straining the cat litter after the cat fecal matter is scooped from the litter box. The scoop region 4 is so dimensioned and proportioned to permit insertion into the cavity 13 of the disinfectant fluid reservoir 9.

By referring to FIGS. 1 and 2, it can be seen that disinfectant fluid reservoir 9 is a box-like structure having a rear wall 14, a bottom plate 15, and a front wall 16, and sidewalls 17 and 18 which form the boundary of cavity 13 and define a reservoir or cavity chamber 19.

It is desirable to have disinfectant fluid reservoir mounted to the cat litter box to permit the deodorizing action of the disinfectant and deodorizing fluid 8 to continuously deodorize the environment of the litter box. In one embodiment to this invention, therefore, the disinfectant fluid reservoir has an arcuate attachment member 21 extending from rear wall 14 which allows engagement of the disinfectant fluid reservoir 9 with peripheral lip 22 of the cat litter box. Since there are many designs for cat litter boxes, the attachment of the reservoir to the litter box may be provided by other simple attachments well known in the prior art. Additionally, the litter box itself may be a construction where the reservoir is integrally part of it.

Referring now to FIG. 3, a bag holder 23 is illustrated for supporting plastic bags 24 into which cat fecal matter may be deposited after removal from the litter box. As can be see in FIG. 3, bag holder 23 is composed of a frame member 24 having suspension pegs 26 projecting therefrom from which plastic bag 24 may be suspended. Frame member 24 in one embodiment of this invention may be a rectangular frame as illustrated in FIG. 3 with a front slat 27, a rear slat 28 and side slats 29 and 31. To suspend the frame from the litter box, a pair of arcuate attachment members 32 and 33 are carried by rear slat 28 for engagement with the peripheral lip 22 of the cat litter box. Although in the embodiment shown in FIG. 3 the frame 24 is rectangular, it will be appreciated that the frame may be of any shape so long as the shape permits the plastic bag to be suspended therefrom. For instance, a triangular shaped frame having a base slat and slide slats with suspension members associated therewith for suspending the bag may also be used. Additionally, the frame may be attached to the litter box in a removable manner or it may be integrally formed with the litter box.

Although not shown in the drawings, fluid reservoir 9 may have a multiplicity of suspension members for suspending plastic bags externally anteriorally of front wall 16 and a first storage region extending from a sidewall 17 so dimensioned and proportioned to permit the storage of plastic bags therein; and a second storage region extending from a sidewall 18 so dimensioned and proportioned to permit the storage of plastic bag ties.

Referring now to FIGS. 1 and 2, it can be seen that the sanitation system of this invention incorporates a scoop device 1 and a disinfectant reservoir container 9 where the reservoir contains a disinfectant and deodorizing fluid. After the scoop is used to remove cat fecal matter, it can then be inserted and is captively held by the disinfectant fluid reservoir where the scoop region 4 is disinfected and the reservoir is sealed by the containment member 3 extending from the handle of the scoop device. A disinfectant solution is preferred which exhibits effective virucital activity against infectious strains which may be contained in cat fecal matter or other diseases which may be carried by the scoop region of the scoop device.

While I have shown and described a sanitization system for cat litter boxes, it is to be understood that the invention is subject to many modifications without departing from the scope and spirit of the claims as recited herein. This invention is not to be limited by the embodiment shown in the drawing and described in the description which is given by way of example and not of limitation.

What is claimed is:

1. A scoop device for straining cat litter comprising:
  (a) a handle member having an axis of elongation and a first end;
  (b) a scoop region extending axially from said first end of said handle member, said scoop region having an opening therein so dimensioned and proportioned to permit straining of said cat litter; and
  (c) a containment member extending laterally of said handle member and located a predetermined distance axially from said scoop region where said containment member has at least one venting orifice extending therethrough.

2. The scoop device recited in claim 1 where said containment member is laterally symmetrical with said axis.

3. The scoop device device recited claim 1 where said containment member is a thin flat plate having a upper surface and a lower surface and where said upper and lower surfaces are orthogonal to said axis.

4. The scoop device recited in claim 3 where said containment member is laterally symmetrical with said axis.

5. In combination:
  (a) a scoop device for straining cat litter comprising a handle member having an axis of elongation and a first end, a scoop region extending axially from said first end of said handle member, said scoop region having an opening therein so dimensioned and proportioned to permit straining of said cat litter, and a containment member extending laterally of said handle member and located a predetermined distance axially from said scoop region where said containment member has at least one venting orifice extending therethrough; and
  (b) a fluid reservoir for use with a cat litter box comprising a housing having an open end and a cavity chamber, where said cavity chamber is so dimensioned and constructed to be in fluid communication with said open end to permit the passage of fluid through said open end and to be sealingly bounded by said housing, and attachment means for removably attaching said housing to said cat litter box.

6. The combination recited in claim 5 where said containment member is laterally symmetrical with said axis.

7. The combination recited in claim 5 where said containment member is a thin flat plate having an upper surface and a lower surface and where said upper and lower surfaces are orthogonal to said axis.

8. The combination recited in claim 5 where said housing is a truncated box-like structure having a front wall, a rear wall, a bottom wall and a pair of side walls and where said rear wall has a vertical dimension greater than the vertical dimension of said front wall and said side walls are symmetrically dimensioned.

9. The combination recited in claim 8 where said attachment means is associated with said rear wall.

10. The combination recited in claim 5 further comprising a fluid having disinfectant properties where said fluid is contained in said cavity chamber.

11. The combination recited in claim 5 further comprising a fluid having deodorizing properties where said fluid is contained in said cavity chamber.

12. The combination recited in claim 5 further comprising a bag holder comprising:

(a) a frame;

(b) support means for supporting a bag carried by said frame; and, (c) an attachment member extending from said frame for removably mounting the frame to said cat litter box.

13. The combination recited in claim 12 wherein said support means comprises a multiplicity of suspension members carried by said frame from which a bag may be suspended.

14. The combination recited in claim 5 wherein said fluid reservoir further comprises support means for supporting a bag carried by said housing.

* * * * *